United States Patent [19]

Christie

[11] Patent Number: 4,758,010
[45] Date of Patent: Jul. 19, 1988

[54] CONVERTIBLE WHEELBARROW

[76] Inventor: Howard C. Christie, 4962 Highland Dr., Blaine, Wash. 98230

[21] Appl. No.: 867,060

[22] Filed: May 27, 1986

[51] Int. Cl.⁴ .............................................. B62B 1/20
[52] U.S. Cl. .............................. 280/47.31; 280/47.18; 280/653
[58] Field of Search ............... 280/47.31, 47.32, 47.33, 280/47.17, 47.18, 653

[56] References Cited

U.S. PATENT DOCUMENTS

| | | | |
|---|---|---|---|
| 977,056 | 11/1910 | Verplanck | 280/47.31 |
| 1,338,144 | 4/1920 | McNeill | 280/47.18 |
| 1,516,856 | 11/1924 | Johnson | 280/47.31 |
| 1,728,081 | 9/1929 | Rust | 280/47.18 |
| 2,636,747 | 4/1953 | Blackmond | 280/47.31 |
| 3,977,477 | 8/1976 | Wise | 280/47.31 |
| 4,261,590 | 4/1981 | Schupbach | 280/47.31 |
| 4,335,897 | 6/1982 | Muller, Jr. | 280/47.18 |
| 4,471,996 | 9/1984 | Primeau | 280/47.31 |

FOREIGN PATENT DOCUMENTS

| | | | |
|---|---|---|---|
| 631325 | 12/1927 | France | 280/47.31 |
| 74097 | 9/1953 | Netherlands | 280/47.31 |

Primary Examiner—John J. Love
Assistant Examiner—Eric Culbreth

[57] ABSTRACT

A convertible wheelbarrow, which is an improvement of the garden type wheelbarrow, having a tray with connectors for quickly removing it from the frame which has a load carrying area behind, above and forward of the wheel.

2 Claims, 2 Drawing Sheets

CONVERTIBLE WHEELBARROW

BACKGROUND OF THE INVENTION

This invention relates to the wheelbarrow and specifically relates to improvement of the light weight wheelbarrow so that the body or tray may be quickly and easily removed to allow novel usage of the frame for the transportation of materials not conveniently or suitably transported in the tray or existing apparatus.

Many homes are now using wood stoves as a source of primary or secondary heating. This results in considerable transportation of wood, often over rough ground and trails and more transportation at home as it is moved to a place of convenience and storage. Present apparatus do not provide a really satisfactory means of transporting such material. Construction type wheelbarrows are too heavy and unwieldly and light weight wheelbarrows often lose part of the wood at the slightest jar unless the load is kept small and the tray substantially level. Both types limit the length of the wood to the size of the tray. Other devices have one or more of the following faults: Poor maneuverability, are unstable, require a good path or one wide enough to accomodate two wheels, limit the length of wood or lack means for securing the load.

Homeowners also are doing much of their own landscaping and remodeling or home improvement which often requires the movement of heavy pieces of cement, rocks, railroad ties, fence posts and other materials for fencing, decking, building and landscaping. Wheelbarrows with trays are not suited for transporting elongated material and large rocks and heavy pieces of cement must be lifted and placed, usually dropped, in the tray with possible injury to the individual and damage to the tray.

SUMMARY OF THE INVENTION

It is the object of this invention to provide a light weight wheelbarrow with a tray that is easily and quickly removed from the frame to allow utilization of the frame as an independent wheelbarrow.

Another object of this invention is to provide a wheelbarrow that can be used to transport a substantial amount of log rounds, stove or fireplace wood without undue effort over rough ground uphill or down and with a great deal of stability and maneuverability.

A further object of this invention is to provide a means of transporting substantially heavy rocks or pieces of cement, timbers and fence posts, railroad ties, logs or other elongated or heavy material with comparatively little effort and with less danger of injury to the person.

The objectives and advantages of my invention will be more apparent from the following drawings and description of the improved convertible wheelbarrow. The drawings show, for the purpose of illustration, one embodiment of means for attaching the tray to or detaching it from the frame and one embodiment of the improved frame which my invention may assume in practice.

DETAILED DESCRIPTION

Figure 1:
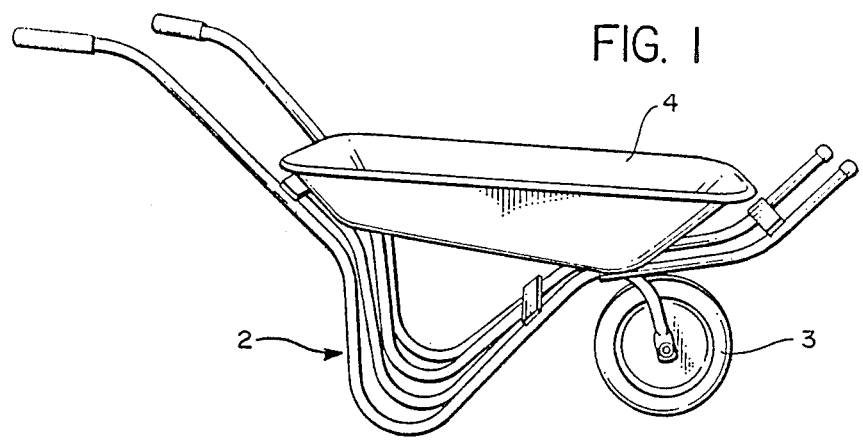
FIG. 1 is a perspective view of the side of the improved wheelbarrow of my invention.

The figures shown in the drawings and the descriptions thereof contemplate that the tray and frame of the wheelbarrow will be made of metal but it will be understood that other suitable material could be used.

Figure 2:
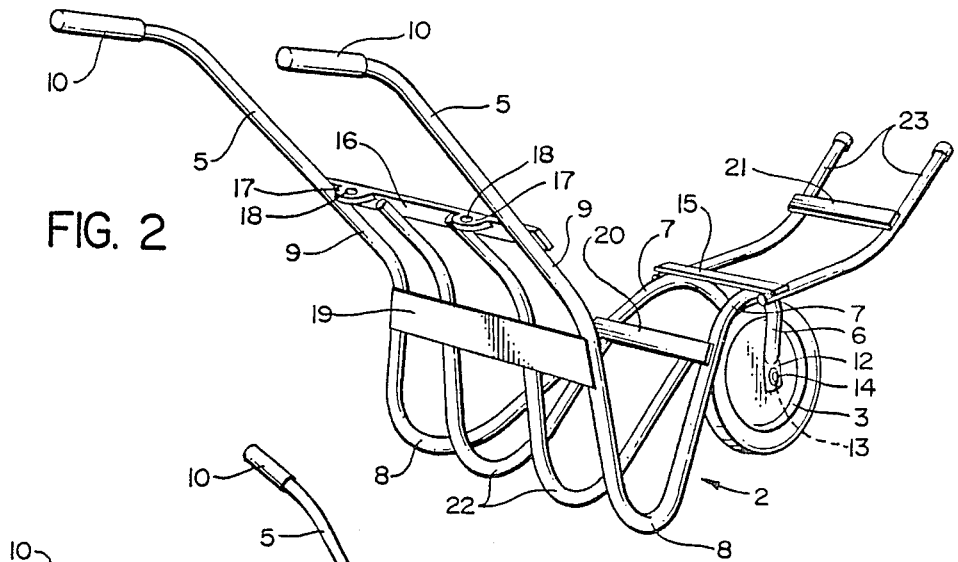
FIG. 2 is a perspective view of the improved frame wheelbarrow from approximately forty-five degrees right of rear center.
Figure 3:
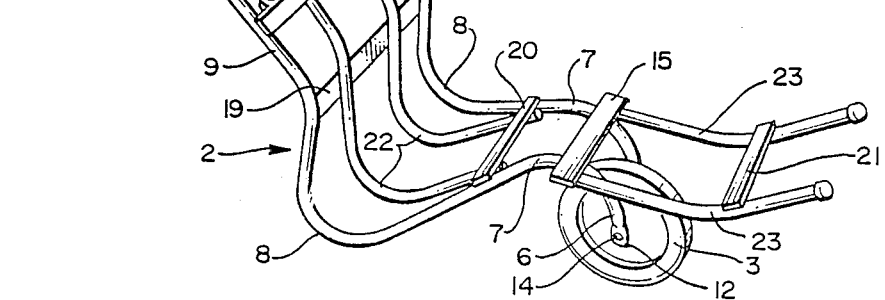
FIG. 3 is a perspective view of the improved frame wheelbarrow from approximately twenty-five degrees right of side center.

Referring more particularly to the drawings; as shown in FIG. 1, the improved wheelbarrow of my invention consists of a frame designated generally with the numeral 2, a wheel 3 and tray 4. FIGS. 2 and 3 show my improved wheelbarrow without the tray. This embodiment of the frame consists of two similar, spaced apart, converging lengths of metallic tubular pipe, approximately one inch in diameter 5 and these have been bent at the forward converging end in a downwardly and forwardly extending direction 6 with the ends flattened 12 and a hole 13 (not visible) formed in each flat area to receive the axle 14 which carries the wheel 3, continuing rearwardly and downwardly from the apex of the wheel supporting portion so as to form, with end 6, a substantially inverted U shaped portion 7 which supports the front of the tray above and rearwardly of the wheel, continuing downwardly and rearwardly to engage the ground and then substantially vertically to form a U shaped portion 8 which constitutes the leg portion and primary load carrying area, continuing rearwardly and upwardly at approximately forty-five degrees from horizontal to constitute the handle portion 9 and rear support for the tray 4, terminating with a substantially horizontal portion 10, the hand grip portion.

The two basic longitudinal members 5 as described in the foregoing paragraph, along with one or more of the cross members, constitute the frame of the well known and much used light weight or garden type wheelbarrow. This frame was intended and used only for the purpose of supporting and transporting the tray and its cargo. My invention provides for its use as an independent wheelbarrow.

Two additional longitudinal members 22 have been located between the two basic longitudinal members 5 so as to form a grid and provide a load carrying area capable of meeting the objectives previously set forth. Longitudinal members 22 are secured to rear cross member 16 that supports the rear of the tray and extend downwardly and forwardly, substantially parallel, following the contour of the basic longitudinal members 5, continuing under horizontal cross member 19, continuing through the primary load carrying, or leg section, 8, of the frame and terminating at a point where they meet the converging members 5, where horizontal cross member 20 is located. At this point members 22 are secured to cross member 20 and/or longitudinal members 5.

Two more longitudinal members 23, extend the load carrying area above and forward of the wheel 3. As shown in FIGS. 1, 2 and 3 these tubular members begin and are secured to the basic members 5 in area 7 of the frame which supports the front of the tray 4, and also may be secured to cross member 15, extending, substantially parallel, in a forwardly and upwardly direction, following the contour of, and somewhat forward of, the front of the tray and terminating at a level approximately four inches higher than the front rim of the tray.

Horizontal cross members 15, 16, 19, 20 and 21 strengthen and stabilize the frame and hold the longitudinal members in proper spaced apart relationship. In addition, cross members 15 and 16 are part of the means for securing tray 4 to frame 2.

Figure 4:
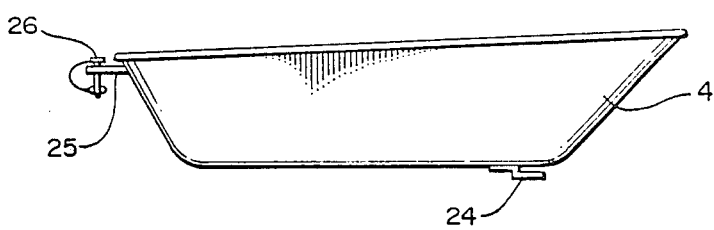
FIG. 4 is a side elevation of the improved tray showing the tray portion of the means for securing the tray to the frame.
Figure 5:
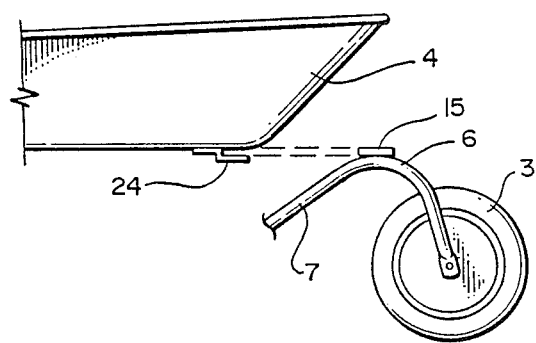
FIG. 5 is a side view of a portion of the tray and of the frame showing how the front of the tray is secured to the frame.
Figure 6:
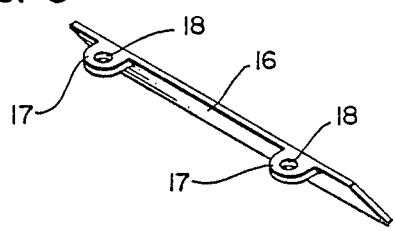
FIG. 6 is a view of the rear cross member of the frame with the frame portion of the means for securing the rear of the tray to the frame.
Figure 7:
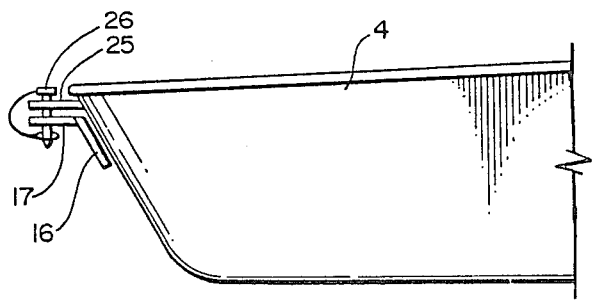
FIG. 7 is a side elevation of the rear portion of the tray with a view of one combined means for securing the rear of the tray to the frame.

FIGS. 4 and 5 show the improved tray 4 with interlocking means 24 at the front bottom portion of the tray which interlocks with cross member 15 of the frame as the means for securing the front of the tray to the frame. Interlocking means 24 is formed from a flat piece of metal approximately one-eighth inch thick, four inches wide and six inches long, with the rearward two inches welded to the bottom of the tray, then the forwardly portion extending downward at right angle from the bottom of the tray for approximately one-half inch and then forward, parallel to the bottom for approximately three inches. Two half moon disks 25, extending rearwardly from the rear rim of tray 4, as shown in FIGS. 4 and 7, oppose similar disks 17 shown in FIGS. 2 and 6, extending rearwardly from rear cross member 16 of the frame. These disks have metal pins 26 inserted through holes 18 to secure the rear of the tray to the frame as shown in FIG. 7.

The manner of connecting various members to one another way be by nuts and bolts, welding, by both or by other appropriate means depending on material used for the frame and tray.

As a result of my invention it will be seen that there is provided a light weight convertible wheelbarrow with a tray that is quickly removable so the frame, which has heretofore been used only for supporting and transporting the tray and its cargo, may now be used as a separate wheelbarrow, making possible the transportation of a much larger variety of items. The low center of gravity of the primary load carrying area results in a more stable load requiring less effort to balance and making it easier to maneuver. The longitudinal members extending above and forward of the wheel significantly increase the load carrying capacity and, when loaded, the weight forward of the wheel lends noticeable counterbalance to the weight rearward of the wheel.

A number of variations and modifications for quickly removing the tray from the frame and for providing a load carrying grid for the frame will become apparent. While I have shown but one embodiment of each, it will be understood that they are merely for the purpose of illustration and description and that various other forms may be devised within the scope of my invention as defined in the claims.

The embodiments of the invention in which a right to patent is claimed are:

1. A convertible wheelbarrow comprising:
   a. removable tray means for holding cargo;
   b. frame means having a first cargo carrying mode in which said tray means is connected to said frame means and, a second cargo carrying mode in which said tray means is disconnected and removed from said frame means; said frame means including
      (1) wheel means for moving said frame means over the ground,
      (2) a forward frame portion located above and forward of said wheel means and,
      (3) a rear frame portion located rearward of said wheel said frame means having a front and rear end with a rear frame portion consisting of,
         (i) first support means comprised of two spaced apart, longitudinal, tubular members extending forwardly in a downwardly direction to engage the ground, then forwardly in an upwardly direction and then forwardly in a downwardly direction, converging toward the front to be joined with the wheel means, and
         (ii) second support means comprised of two spaced apart, substantially parallel, longitudinal, tubular members located between the first support means, extending in the same forwardly, downwardly and forwardly, upwardly direction as the first support members, joining with said converging first support members rearwardly of said wheel means.

2. The convertible wheelbarrow as set forth in claim 1 wherein said forward frame portion consists of two spaced apart, substantially parallel, tubular members extending from the rear frame portion in a forwardly and then a forwardly, upwardly direction above and forward of said wheel means, in such a manner as to contain the cargo at the front end of said wheelbarrow.

* * * * *